United States Patent
Rüdell

(10) Patent No.: US 11,260,841 B2
(45) Date of Patent: Mar. 1, 2022

(54) ACTUATING DEVICE FOR A VEHICLE BRAKE SYSTEM

(71) Applicant: ZF Active Safety GmbH, Koblenz (DE)

(72) Inventor: Axel Rüdell, Urbar (DE)

(73) Assignee: ZF Active Safety GmbH, Koblenz (DE)

(*) Notice: Subject to any disclaimer, the term of this patent is extended or adjusted under 35 U.S.C. 154(b) by 0 days.

(21) Appl. No.: 17/172,323

(22) Filed: Feb. 10, 2021

(65) Prior Publication Data

US 2021/0162969 A1    Jun. 3, 2021

Related U.S. Application Data

(63) Continuation of application No. 16/610,944, filed as application No. PCT/EP2018/060720 on Apr. 26, 2018, now Pat. No. 10,946,847.

(30) Foreign Application Priority Data

May 12, 2017    (DE) .................... 10 2017 004 584.4

(51) Int. Cl.
   *B60T 11/18*    (2006.01)
   *B60T 11/16*    (2006.01)

(52) U.S. Cl.
   CPC .............. *B60T 11/18* (2013.01); *B60T 11/165* (2013.01)

(58) Field of Classification Search
   CPC .......... B60T 11/16; B60T 11/165; B60T 11/18
   See application file for complete search history.

(56) References Cited

U.S. PATENT DOCUMENTS

| | | |
|---|---|---|
| 3,173,266 A | 3/1965 | Shutt |
| 6,810,787 B2 | 11/2004 | Welter et al. |
| 6,813,991 B2 | 11/2004 | Koeth |
| 7,047,868 B2 | 5/2006 | Nolan et al. |
| 7,188,563 B2 | 3/2007 | Liebig et al. |
| 9,341,265 B2 | 5/2016 | Bernadat et al. |
| 10,766,471 B2 | 9/2020 | Anderson et al. |
| 10,946,847 B2 * | 3/2021 | Rudell .................... B60T 11/18 |

FOREIGN PATENT DOCUMENTS

| | | |
|---|---|---|
| DE | 102004038371 A1 | 3/2006 |
| DE | 102006056674 A1 | 5/2008 |
| EP | 2000376 A1 | 12/2008 |

(Continued)

*Primary Examiner* — Michael Leslie
(74) *Attorney, Agent, or Firm* — Robert James Harwood

(57) ABSTRACT

The actuating device for a vehicle brake system comprises a force input member, which can be coupled to a brake pedal, and a brake master cylinder. The brake master cylinder has at least one force transmission member. The force transmission member is coupled to the force input member in an articulating fashion. The force transmission member is positioned to transmit a force, which has been exerted onto the force input member, to the brake master cylinder. The actuating device has at least one elastically deformable positioning element. The at least one positioning element produces a holding force with which the at least one positioning element holds the at least one force input member in an installation position relative to the brake master cylinder.

17 Claims, 6 Drawing Sheets

(56) References Cited

FOREIGN PATENT DOCUMENTS

| FR | 2735086 A1 | 12/1996 |
|---|---|---|
| GB | 1055830 A | 1/1967 |
| GB | 2142396 A | 1/1985 |
| GB | 2222213 A | 2/1990 |
| KR | 20010105693 A | 11/2001 |
| WO | 2004/048174 A1 | 6/2004 |

\* cited by examiner

ACTUATING DEVICE FOR A VEHICLE BRAKE SYSTEM

CROSS-REFERENCE TO RELATED APPLICATION

This application is a Continuation of U.S. patent application Ser. No. 16/610,944, which is a national stage of International Application No. PCT/EP20181060720, filed Apr. 26, 2018, the disclosure of which is incorporated herein by reference in its entirety, and which claimed priority to German Patent Application No. 102017004584.4, filed May 12, 2017, the disclosure of which is incorporated herein by reference in its entirety.

TECHNICAL FIELD

The present disclosure generally relates to the technical field of actuating devices for vehicle brake systems. Such actuating devices can be used to actuate an electrohydraulic vehicle brake system and also to actuate a purely hydraulic vehicle brake system. The present disclosure also relates to a brake booster system and to a vehicle brake system equipped with such an actuating device.

BACKGROUND

Actuating devices of this generic type for vehicle brake systems have a force input member, which can be coupled to a brake pedal, and a piston or another force transmission member. The actuating force exerted by the brake pedal on the force input member is transmitted to a brake master cylinder by the force transmission member. Because of how it is mounted in the vehicle, the brake pedal traces a pivoting movement during actuation. In order to be able to follow this pivoting movement, the force input member is connected to the force transmission member in an articulating fashion. Such actuating devices are known from the prior art.

A brake pressure generator is disclosed in the document DE 10 2004 038 371 A1. The brake pressure generator has a force input member, which can be coupled to a brake pedal. The force input member has a spherically shaped end with which it is accommodated in a transmission element. The force input member can be moved together with the transmission element. The force input member is coupled in an articulating fashion by means of a linkage device to a guide piston. In a region close to the pedal, the guide piston has a spherical curvature with an opening. In this region, convexly or concavely curved joint discs are provided. This arrangement produces a pivoting guidance of the force input member around a pivot point relative to the guide piston so that depending on the angular position of the brake pedal, the force input member can be pivoted into a position that corresponds to the angular position of the brake pedal.

A pivotable force input member can complicate the installation of the actuating device in the vehicle and in particular, can complicate the task of coupling the force input member to the brake pedal once the actuating device has been installed in the vehicle.

SUMMARY

The object of the invention is to disclose an easy-to-install actuating device for a vehicle brake system. The actuating device for a vehicle brake system disclosed here comprises a force input member, which can be coupled to a brake pedal, and a brake master cylinder. The brake master cylinder has at least one force transmission member. The force transmission member is coupled to the force input member in an articulating fashion. The force transmission member is positioned to transmit a force, which has been exerted on the force input member, to the brake master cylinder. The actuating device comprises at least one elastically deformable positioning element. The at least one positioning element produces a holding force with which the at least one positioning element holds the at least one force input member in an installation position relative to the brake master cylinder.

The installation position of the force input member can correspond to a position of the force input member relative to the brake master cylinder in which a longitudinal axis of the force input member assumes a predetermined orientation relative to a longitudinal axis of the brake master cylinder. The longitudinal axis of the force input member can extend obliquely or parallel to the longitudinal axis of the brake master cylinder. According to one implementation, the longitudinal axis of the force input member can essentially coincide with the longitudinal axis of the brake master cylinder in the installation position of the force input member.

The at least one positioning element can permit a deflection of the force input member after the holding force is exceeded. The deflection of the force input member out of the installation position can take place through elastic deformation of the positioning element. The deflection can be deflected from the installation position in various directions relative to the brake master cylinder. The amount of the deflection capacity can, for example, be approx. 2 to 5 or 8°, in particular approx. 3°. The holding force can have a value of approximately 2 to 10 N, preferably 3 to 7 N, and in particular 5 N. The holding force produced by the at least one positioning element can depend on the force input member's weight force, which the force input member can exert on the positioning element in the position in which the positioning element is resting against the actuating device.

The at least one positioning element can extend between the force input member and the force transmission member. The at least one positioning element can extend in the radial and/or axial direction relative to the force input member. The at least one positioning element can be supported against the force input member and force transmission member in the axial direction and/or relative to a pivoting movement. The force input member can have a bead, a projection, a step, or a recess against which the at least one positioning element can be supported. The force transmission member can have a step or a projection against which the at least one positioning element can be supported. The step can be embodied in a recess in the force transmission member. The step can divide the recess into a section with a smaller diameter and a section with a larger diameter. The at least one positioning element can extend at least partially in the section with the larger diameter.

The at least one positioning element can be moved together with the force input member and/or the force transmission member. The at least one positioning element, the force transmission member, and the force input member can be moved along the longitudinal axis of the brake master cylinder. The at least one positioning element, the force transmission member, and the force input member can be moved together as a unit. The longitudinal axis of the brake master cylinder can define the actuation direction of the actuating device. The positioning element can consist of a solid material, an open-pored material, or a closed-pored material, each with elastic properties. Possible materials for the positioning element include foams or elastomers.

The force input member can extend through the at least one positioning element. The at least one positioning element can be embodied in the form of a bushing. The positioning element can be made from an at least essentially fluid-tight material or an open-pored material. The at least one positioning element can be accommodated in a region of the force transmission member. In this case, the positioning element cannot be used for aspirating air, for example, for a vacuum brake booster and in particular, cannot be suitable for such a purpose. The at least one positioning element can have at least one spring. The at least one spring can extend around part of the force input member. The spring can be supported with one end against the force transmission member and with its other end against the force input member. The spring can be embodied as conical. The spring can thus have a decreasing or increasing diameter. The spring can be a leaf spring or a coil spring.

The actuating device can have at least one intermediate element. The at least one intermediate element can be connected to the at least one force transmission element (e.g. rigidly). The at least one positioning element can be supported against the intermediate element and the force input member. The intermediate element can be connected to the force transmission member by means of a threaded connection. The force transmission member can have at least one recess in which the at least one positioning element is at least partially accommodated. The recess of the force transmission member can have a bottom against which the force input member can be indirectly or directly supported in the axial direction. The force transmission member can be a solid body that the recess does not penetrate. The recess of the force transmission member can have an internal thread. The intermediate element can have a tubular section with an external thread, which can be screw-connected to the internal thread in the recess of the force transmission member.

The at least one positioning element can be at least partially accommodated in the intermediate element. The intermediate element can have a step against which the positioning element can be supported. The step can be embodied in an opening in the intermediate element. The step can divide the opening of the intermediate element into a section with a smaller diameter and a section with a larger diameter. The at least one positioning element can extend at least partially in the section of the opening with the larger diameter or be accommodated in this section. The two sections of the opening can be embodied as cylindrical. The opening can have a conical section. The conical section can form an end section of the opening in which the diameter of the opening widens further. This conical end section can be provided in the section of the opening with the larger diameter. The force transmission member and the force input member can be coupled via an articulation. The articulation can define a pivot point around which the force input member can be deflected. The force input member can be deflected around the pivot point through elastic deformation of the positioning element. The deflection capacity from the installation position can be approx. 2 to 5°, in particular approx. 3°.

The force input member can have a spherical end section. The force transmission member can also have a coupling device for coupling the force input member to a brake pedal. The coupling device can be provided at the end of the force input member opposite from the spherical end section. The at least one positioning element can be positioned closer to the spherical end section than to the coupling device in the direction of the longitudinal axis of the force input member. The force transmission member can have a recess in which the spherical end section of the force input member can be accommodated. The recess of the force transmission member and the spherical end section of the force input member can form the articulation that defines the pivot point. The recess of the force transmission member can have a receiving bushing in which the spherical end section of the force input member can be accommodated. The receiving bushing can extend along the bottom of the receptacle. The outer surface of the spherical section rests at least partially against the receiving bushing to form the articulation. An end of the receiving bushing can rest against an end of the intermediate element.

The actuating device can have at least one housing. In the housing, the force transmission member can be movably guided along the longitudinal axis of the brake master cylinder. In one variant, the force transmission member can move together with the force input member and the at least one positioning element relative to the housing. The force transmission member can be a piston or an element that is rigidly connected to the piston. The piston can be part of the brake master cylinder and can exert pressure on a pressure chamber of the brake master cylinder. The pressure chamber can exert pressure on a pedal force simulator. This is the case, for example, in brake-by-wire vehicle brake systems. With a hydraulic vehicle brake system, one or more hydraulic circuits can be connected to the pressure chamber so that hydraulic pressure is exerted on the wheel brakes that are connected to the hydraulic circuits via the pressure chamber. The actuating device can have a cover element, which is connected to the housing or to a housing. The cover element can partially encompass the force input member and force transmission member.

Another object of the invention is to disclose a system with an actuating device of the above described type, with an electromechanical brake booster or a hydraulic brake booster. According to one implementation, the system comprises no vacuum brake booster and according to another implementation, it is not provided in an intake path of a vacuum brake booster, i.e. it is not necessary to let in or aspirate any air, for example, through the positioning element for a vacuum brake booster. In particular, the positioning element in this variant is not embodied as a filter element for air that is to be aspirated.

The electromechanical brake booster can comprise an actuating unit, which can be coupled to the brake master cylinder. The actuating unit can have at least one actuating element, which can be coupled to an electric motor via a transmission. The electromechanical brake booster can also comprise at least one housing that can at least partially accommodate the actuating unit and actuating device. The at least one actuating unit can have a force transmission element that can be coupled to the at least one actuating element in a force-transmitting way. The at least one force transmission element can accommodate the at least one force transmission member. The force transmission element can move in the direction of the longitudinal axis of the brake booster. The at least one force transmission element can have a receptacle for a rubber-elastic reaction disc. The rubber-elastic reaction disc can rest against a contacting surface of the force transmission element.

The force transmission member can be embodied in the form of a piston and can be accommodated in the force transmission element in movable fashion relative to the force transmission element. The force transmission member can be supported against the force transmission member by means of a spring. The at least one force transmission element can have at least one contacting projection. The at least one actuating element can be brought into contact with the at least one contacting projection. In other words, the at least one actuating element can rest against the contacting projection of the force transmission element in order, by means of this contact, to be able to transmit the boosting force, which is produced by the electric motor and the transmission, to the force transmission element.

The at least one actuating element can have at least one toothed rack section that can be coupled to the electric motor via a transmission. The transmission can be a spur gear pair, which is driven by an electric motor and is coupled to the at least one toothed rack section. By means of the toothed rack section, the rotary motion output by the electric motor can be converted into a translatory motion of the at least one actuating element. The at least one actuating element can have two or more toothed rack sections, which can each engage with a gear or spur gear of the transmission.

Another object of the invention is to disclose a vehicle brake system with an actuating device of the above-described type.

BRIEF DESCRIPTION OF THE FIGURES

Other advantages, details, and features of the solution described herein ensue from the following description of exemplary embodiments and from the figures. In the drawings.

DETAILED DESCRIPTION

Figure 1:
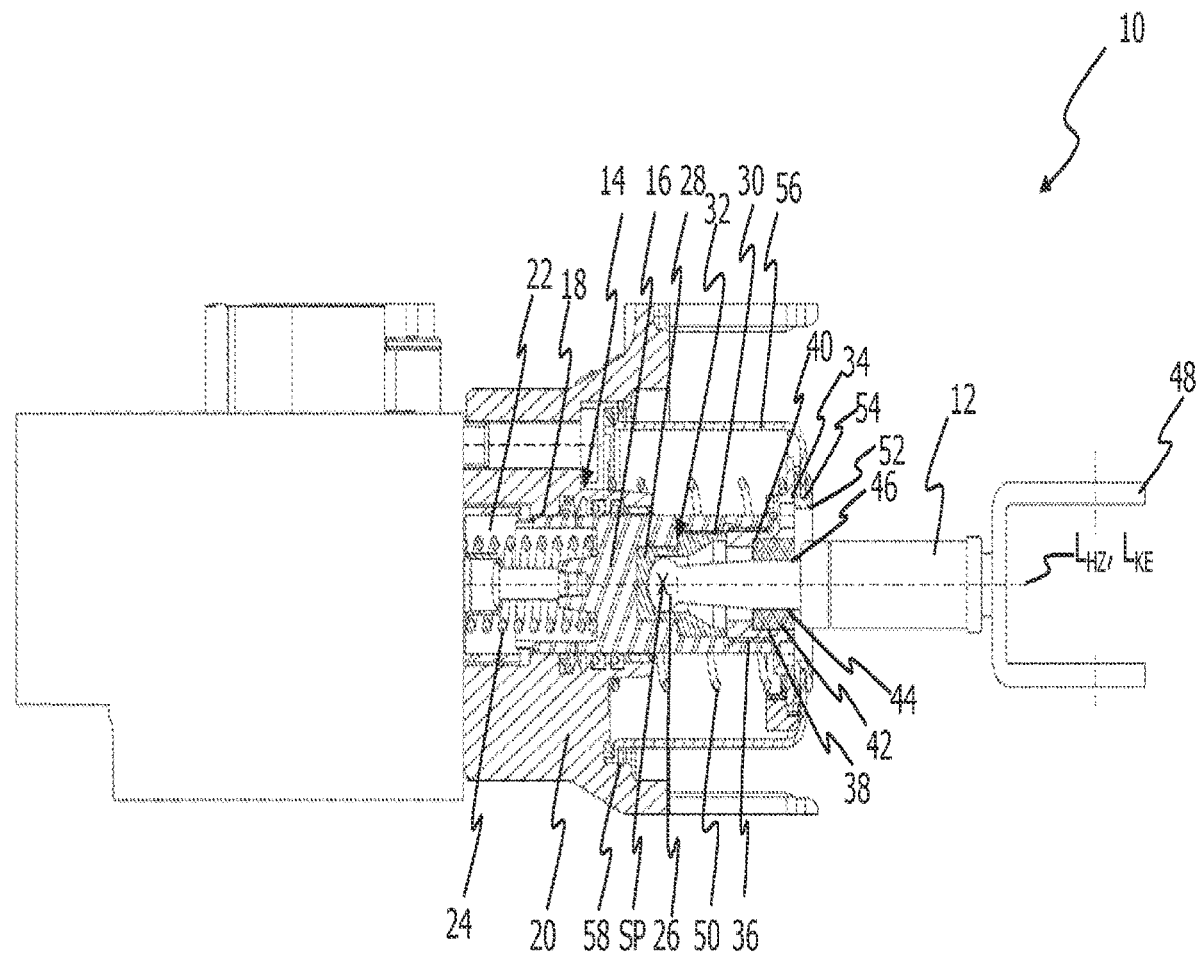
FIG. 1 shows a sectional view of an actuating device according to a first exemplary embodiment.

FIG. 1 shows a sectional view of an actuating device for a vehicle brake system. The actuating device is generally labeled with the reference numeral 10. The actuating device 10 comprises a force input member 12 and a brake master cylinder 14. The brake master cylinder 14 has a force transmission member 16. The force transmission member 16 is a piston of the brake master cylinder 14. By means of the force transmission member 16, the force that a brake pedal, not shown, exerts on the force input member 12 can be transmitted to the brake master cylinder 14. The force transmission member 16 is accommodated in a bore or generally in a recess 18 in a housing. The force transmission member 16 is able to move along a longitudinal axis $L_{HZ}$ of the brake master cylinder 14 relative to the housing 20. The longitudinal axis $L_{HZ}$ of the brake master cylinder 14 defines the actuation direction of the actuating device 10. The force transmission member 16, together with the wall of the recess 18, defines a hydraulic pressure chamber 22 in the housing 20. In addition to the pressure chamber 22, the brake master cylinder 14 can also have other pressure chambers. A pressure outlet, not shown in FIG. 1, of the pressure chamber 22 can be connected to a pedal force simulation unit. This is the case when the actuating device 10 is used in a brake-by-wire vehicle brake system. The pressure outlet of the pressure chamber 22 can also be connected to one or more hydraulic circuits in order to exert hydraulic pressure on the connected wheel brakes. There is no vacuum brake booster connected to the actuating device. The pressure chamber 22 has a spring 24 extending in it, which is supported against the force transmission member 16 and can, for example, couple the force transmission member 16 to an additional piston, which is not shown.

The force input member 12 is coupled to the force transmission member 16 in an articulating fashion. The force input member 12 has a spherically embodied end section 26, which is accommodated in a receiving bushing 28. The receiving bushing 28 is accommodated in a recess or generally a receptacle 30 in the force transmission member 16. The recess 30 is embodied in stepped fashion, with two sections of different diameter. The spherical end section of the force input member 12 is accommodated in the section of the recess 30 with the smaller diameter. The receiving bushing 28 extends from the section with the smaller diameter into the section with the larger diameter. The receiving bushing 28 also extends along the bottom of the recess 30. The spherical end section 26 of the force input member 12 rests with its outer surface against the receiving bushing 28. The spherical end section 26 of the force input member 12, together with the receiving bushing 28 accommodated in the force transmission member 16, forms an articulation 32. The force input member 12 can be pivoted relative to the force transmission member 16 by means of the articulation 32. The articulation 32 defines a pivot point SP around which the force input member 12 can be pivoted and thus deflected.

An intermediate element 34 is provided on the force transmission member 16. The intermediate element 34 rests with one of its ends against the receiving bushing 28. The intermediate element 34 is connected to the force transmission member 16 by means of a threaded connection 36. In the recess 30 of the force transmission member 16, an internal thread is provided, which cooperates with an external thread on the intermediate element 34 to produce the threaded connection 36. The intermediate element 34 has a tubular section that is provided with the external thread and is accommodated in the recess 30 in the force transmission member 16. The force input member 12 extends through an opening 38 in the intermediate element 34. The opening 38 of the intermediate element 34 has a step 40, which divides the opening 38 into a section with a smaller diameter and a section with a larger diameter.

An elastically deformable positioning element 42 is positioned on the intermediate element 34. The positioning element 42 extends in the opening 38. The positioning element 42 is supported in the axial direction against the step 40 of the opening 38. The positioning element 42 is accommodated in the section of the opening 38 with the larger diameter. The positioning element 42 is embodied in the form of a tubular bushing and has an opening 44 through which the force input member 12 extends. The inner circumference surface of the opening 44 rests against a section of the outer circumference surface 46 of the force transmission member 12, The positioning element 42 can be moved together with the force input member 12, the force transmission member 16, and the intermediate element 34 along the longitudinal axis $L_{HZ}$ of the brake master cylinder 14 relative to the housing 20. The actuating device can be mounted to the vehicle (not shown) by means of the housing 20.

FIG. 1 shows the installation position of the force input member 12. The positioning element 42 is embodied as elastically deformable and produces a holding force in the form of a spring force with which the force input member 12 is held in its installation position. When the holding force is exceeded, an elastic deformation of the positioning element 42 occurs in opposition to this spring force. The spring force can have an arbitrary (e.g. linear) characteristic curve.

In the installation position of the force input member 12, the longitudinal axis $L_{KE}$ of the force input member 12 coincides with the longitudinal axis $L_{HZ}$ of the brake master cylinder 14, i.e. the longitudinal axes $L_{HZ}$, $L_{KE}$ of the force input member 12 and the brake master cylinder 14 are superposed. The longitudinal axis $L_{HZ}$ of the brake master cylinder 14 defines the actuation direction in which the force input member 12 and the force transmission member 16 can be moved in order to actuate the brake master cylinder 14. After the holding force is exceeded, the force input member 12 can be pivoted around the pivot point SP that is defined by the articulation 32.

The force input member 12 has a coupling device 48 with which the force input member 12 can be coupled to a brake pedal, not shown. The coupling device 48 is embodied as fork shaped. The coupling device 48 is provided at the end of the force input member 12 opposite from the spherical end section 26. The positioning element 42 is positioned closer to the spherical end section 26 than to the coupling device 48 in the direction of the longitudinal axis $L_{HZ}$ of the brake master cylinder 14 and in the direction of the longitudinal axis $L_{KE}$ of the force input member 12.

A spring 50 extends between the housing 20 and the intermediate element 34, The spring 50 prestresses the force input member 12 and the force transmission member 16 with the intermediate element 34 into the non-actuated position of the actuating device 10. The spring 50 presses the intermediate element 34 against a contacting element 52. The contacting element 52 extends along an opening 54 of a cover element 56. The cover element 56 encompasses the force transmission member 16 and the intermediate element 34 so that the intermediate element 34 can be supported against the cover element 56 by means of the contacting element 52. The positioning element 42 is positioned inside the cover element 56 in the direction of the longitudinal axis $L_{HZ}$ of the brake master cylinder 14. The cover element 56 is fastened to the housing 20 by means of a securing ring 58.

Figures 2, 3:
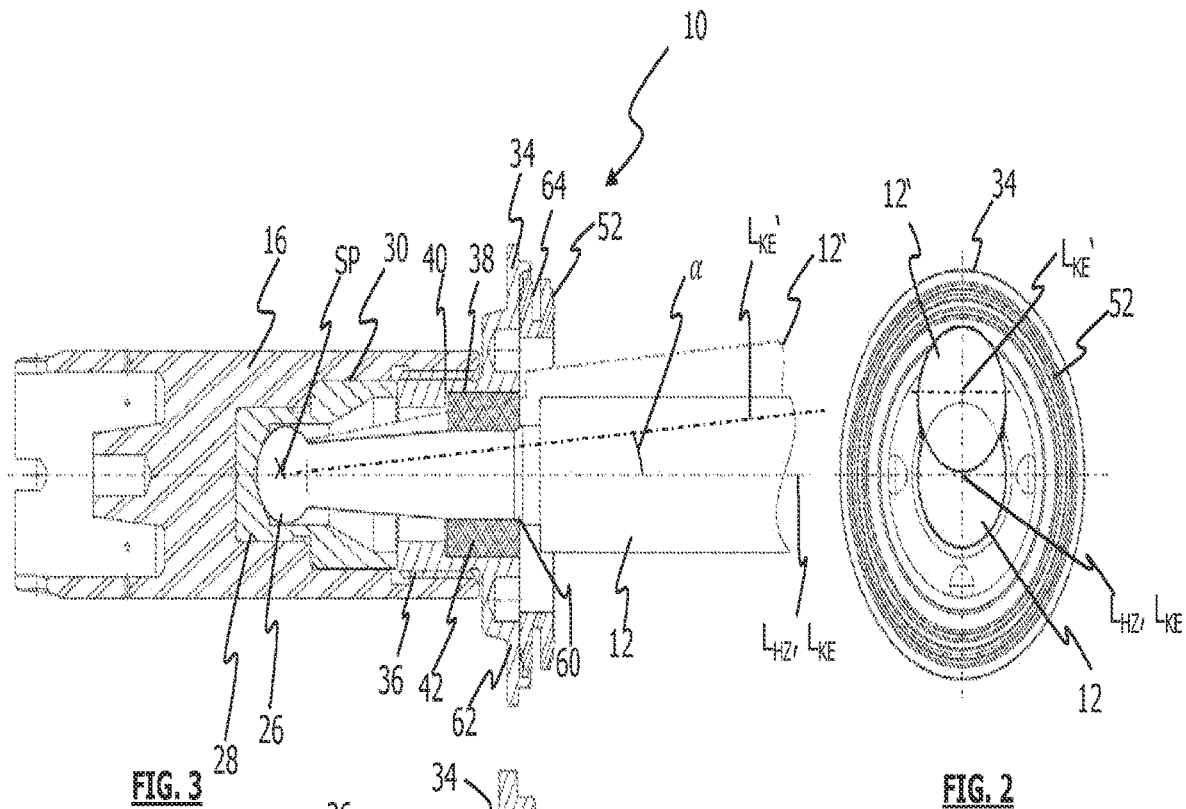
FIG. 2 shows a side view of a force input member and a force transmission member coupled thereto.
FIG. 3 shows a view of a sectionally depicted force transmission member with the force input member coupled thereto.

FIG. 2 shows a side view of the force input member 12, the intermediate element 34, and the contacting element 52. In FIG. 2, the force input member 12, 12' is depicted in the installation position and in the deflected position. In the installation position of the force input member 12, the longitudinal axes $L_{HZ}$ of the brake master cylinder 14 and the longitudinal axis $L_{KE}$ of the force input member 12 coincide. By contrast with this, the longitudinal axes $L_{KE}$' of the force input member 12' and $L_{HZ}$ of the brake master cylinder 14 in the deflected position of the force input member 12' do not coincide. In the deflected position, the longitudinal axis $L_{KE}$' of the force input member 12 extends obliquely relative to the longitudinal axis $L_{HZ}$ of the brake master cylinder 14.

FIG. 3 shows a view in which the force transmission member 16 with the intermediate element 34, the contacting element 52, and the positioning element 42 is depicted in sectional form. The force transmission member 12, 12' is shown as a solid body. In FIG. 3, the force transmission member 12, 12' is depicted in the installation position and in the deflected position. The force transmission member 12 depicted with solid lines shows the installation position in which the longitudinal axes $L_{HZ}$ of the brake master cylinder 14 and the longitudinal axis $L_{KE}$ of the force input member 12 coincide. The force input member 12' in the deflected position is depicted with dashed lines. In this position, the longitudinal axis $L_{KE}$' of the force input member 12' and the longitudinal axis $L_{HZ}$ of the brake master cylinder 14 intersect at the pivot point SP. With the holding force produced by the positioning element 42, the force input member 12 can be held in the installation position. In order to be able to deflect the force input member 12 into the position depicted with dashed lines, it is necessary to overcome the holding force produced by the positioning element 42. The deflection of the force input member 12 takes place through an elastic deformation of the positioning element 42. The force input member 12 can be deflected by an angle α around the pivot point SP into the deflected position (force input member 12'). The angle α can, for example, be 3°. The angle α between the longitudinal axis $L_{HZ}$ of the brake master cylinder 14 and the longitudinal axis $L_{KE}$' of the force input member 12' is shown in FIG. 3 in the deflected position.

The positioning element 42 is supported against the shoulder 40 of the opening 38 of the intermediate element 34 and against a conical section 60 on the force input member 12. The intermediate element 34 has a disc-shaped section 62 with which the intermediate element 34 rests against the contacting element 52 in the starting position (see FIG. 1). The contacting element 52 has a slot 64 in which an edge region of the opening 54 of the cover element 56 can be accommodated.

Figure 4:
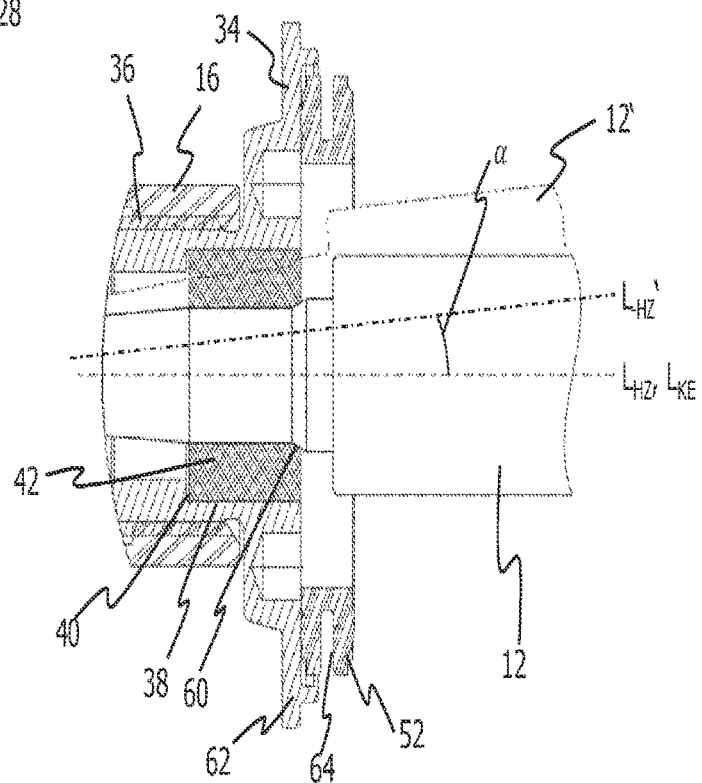
FIG. 4 shows an enlarged detail of the view according to FIG. 3.

FIG. 4 shows an enlarged detail from the view according to FIG. 3. In FIG. 4, the force input member 12 is depicted with solid lines in the installation position and the force transmission member 12' is depicted with dashed lines in the deflected position. The force input member 12 can be deflected by the angle α out of the installation position through an elastic deformation of the positioning element 42 when the holding force in the magnitude of the spring force produced by the positioning element 42 has been exceeded.

Figure 5:
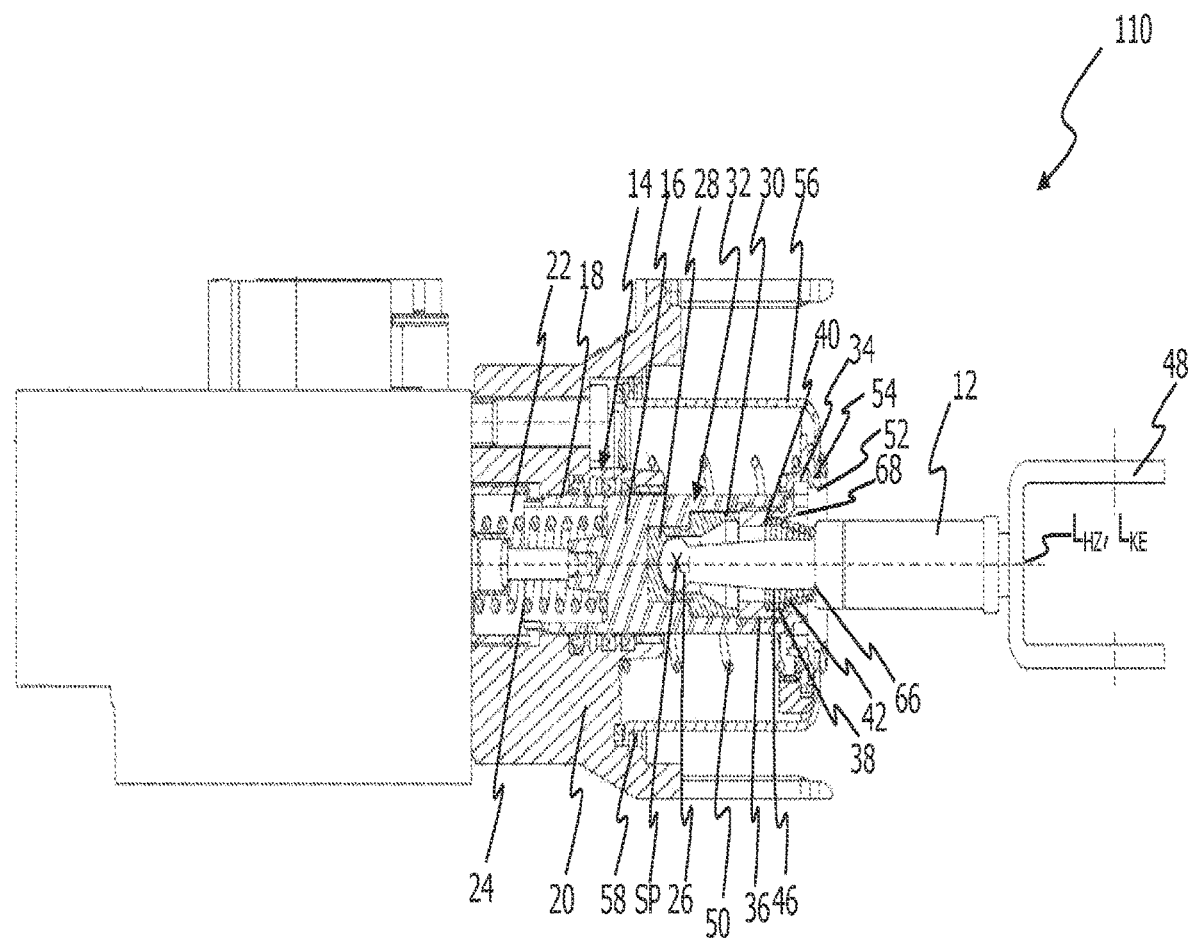
FIG. 5 shows a sectional view of an actuating device according to a second exemplary embodiment.

FIG. 5 shows a second exemplary embodiment of the actuating device 110 for a vehicle brake system. The positioning element 42 is embodied in the form of a spring, which partially encompasses the force input member 12. The force input member 12 has a step, for example in the form of a shoulder 66, against which the spring 42 is supported with one of its ends. With its other end, the spring 42 is supported against the step 40 of the intermediate element 34. The spring 42 is conical in shape. The diameter of the spring 42 decreases starting from its section resting against the step 40 in the direction of the shoulder 66 on the force input member 12. The axial end section 68 of the opening 38 of the intermediate element 34 widens out conically, i.e. the diameter of the opening 38 increases continuously in the section 68. By means of the conical section 68, the force input member 12 can be deflected through an elastic deformation of the spring 42. If the spring 42 comes into contact with the conical section 68, the deflection of the force input member 12 is limited.

Figure 7:
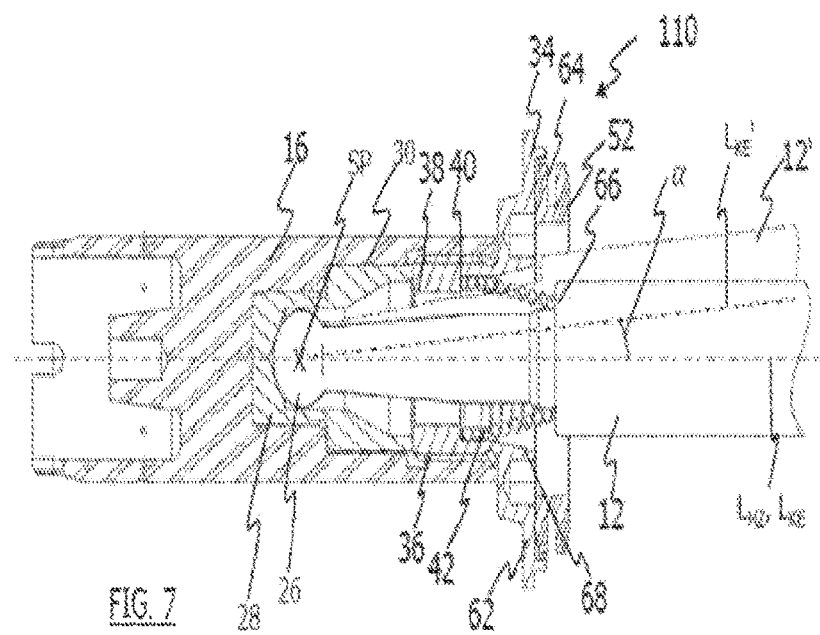
FIG. 7 shows a view of a sectionally depicted force transmission member and a force input member coupled thereto.
Figure 6:
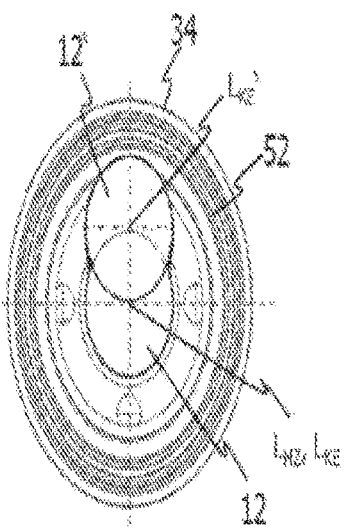
FIG. 6 shows a side view of a force transmission member and the force input member coupled thereto.

FIG. 6 shows a side view of the force input member 12, the intermediate element 34, and the contacting element 52, in which the force input member 12, 12' is depicted in the installation position and in the deflected position, FIG. 7 shows a view in which the force transmission member 16 with the intermediate element 34, the contacting element 52, and the positioning element 42 is depicted in sectional form and the force transmission member 12, 12' is depicted as a solid body. The force transmission member 12 depicted with solid lines corresponds to the installation position in which the longitudinal axes $L_{HZ}$ of the brake master cylinder 14 and the longitudinal axis $L_{KE}$ of the force input member 12 coincide. Dashed lines are used to depict the force input member 12' in the deflected position, in which the longitudinal axis $L_{KE}'$ of the force input member 12 and the longitudinal axis $L_{HZ}$ of the brake master cylinder 14 intersect at the pivot point SP. The force input member 12' depicted with dashed lines has been deflected by the angle α out of the installation position around the pivot point SP into the deflected position.

The opening 38 of the intermediate element 34 has a conical end section 68. The conical end section 68 is embodied in the section of the opening 38 with the larger diameter. In this section, the opening 38 extends first in cylindrical fashion starting from the step 40 before it transitions into the conical section 38. In the conical section 68, the diameter of the opening widens continuously until the axial end of the intermediate element 34.

Figure 8:
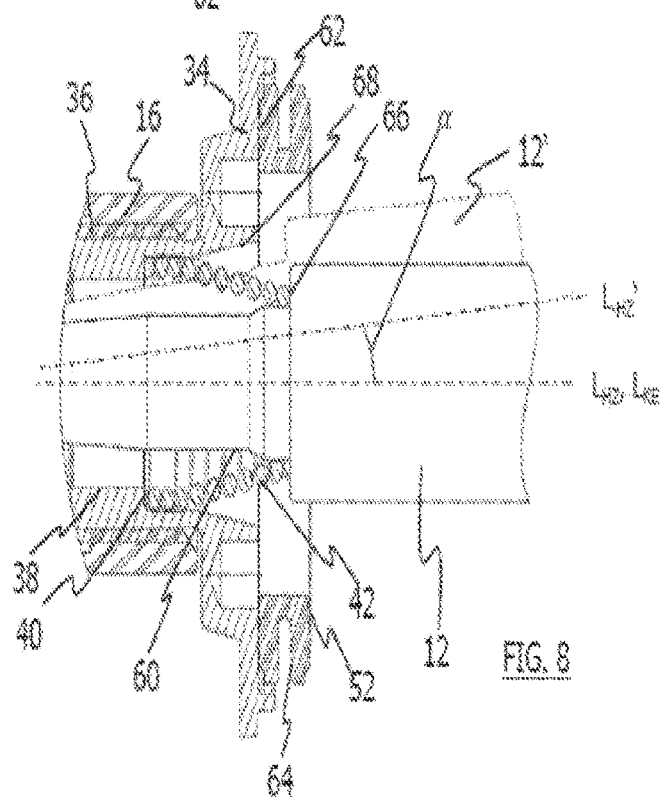
FIG. 8 shows an enlarged detail of the view according to FIG. 7.

FIG. 8 shows an enlarged detail of the view according to FIG. 7, The holding force produced by the spring 42 can hold the force input member 12 in the installation position depicted with solid lines. In order to deflect the force input member 12 into the position depicted with dashed lines, the spring 42 is elastically deformed after the holding force has been exceeded. The force input member 12 can be deflected through an elastic deformation of the spring 12 by an angle α around the pivot point SP into the deflected position (force input member 12'). The spring 42 extends from the step 40 of the intermediate element 34 in the direction of the shoulder 68 on the force input member 12. The step 40 and the shoulder 68 are offset from each other in the axial direction by the axial dimension of the spring 42. The spring 42 is thus supported against the step 40 and the shoulder 68 in order to hold the force input member 12 in the installation position.

Figure 9:
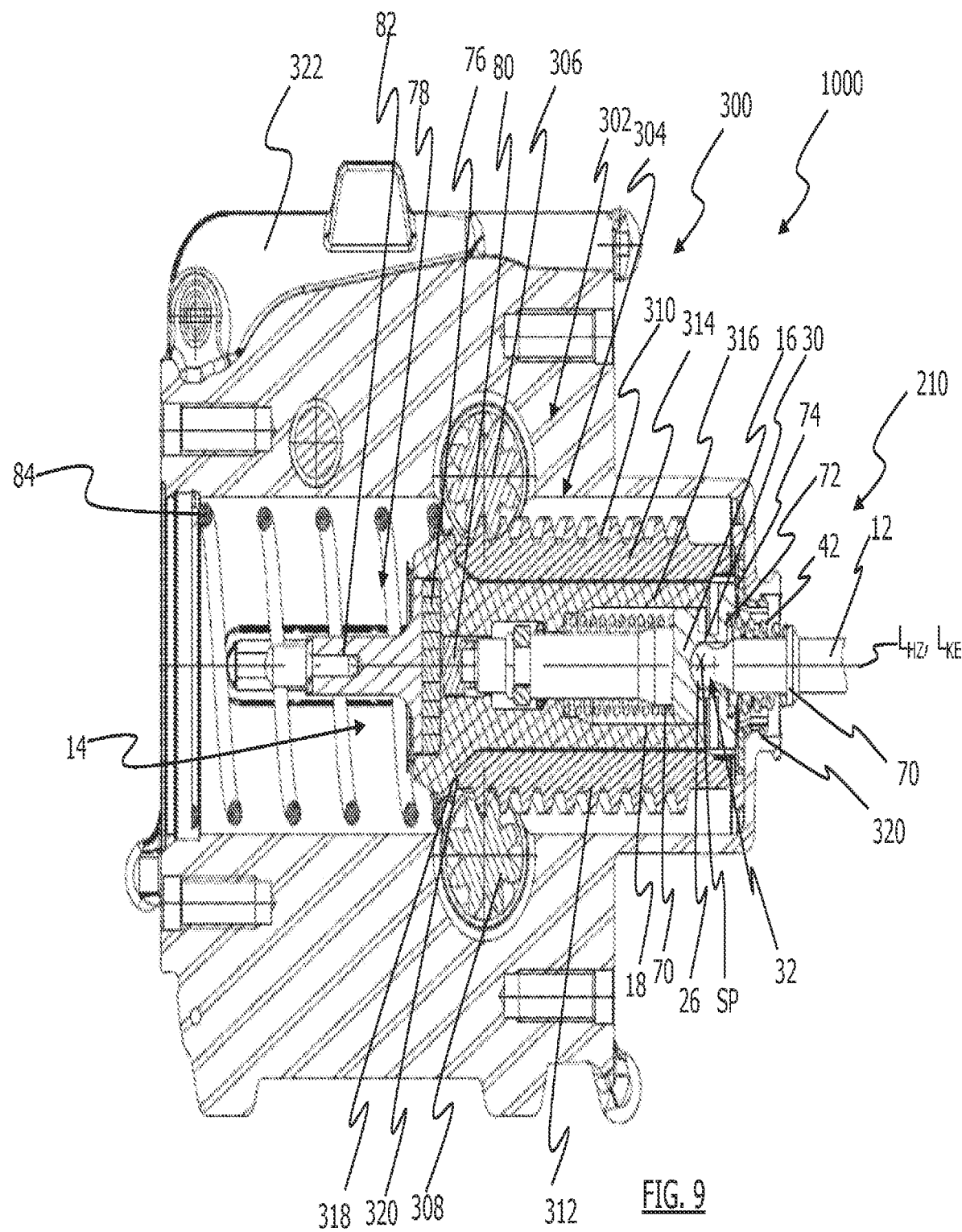
FIG. 9 shows a sectional view of a system composed of an electromechanical brake booster and an actuating device according to a third exemplary embodiment.
Figure 10:
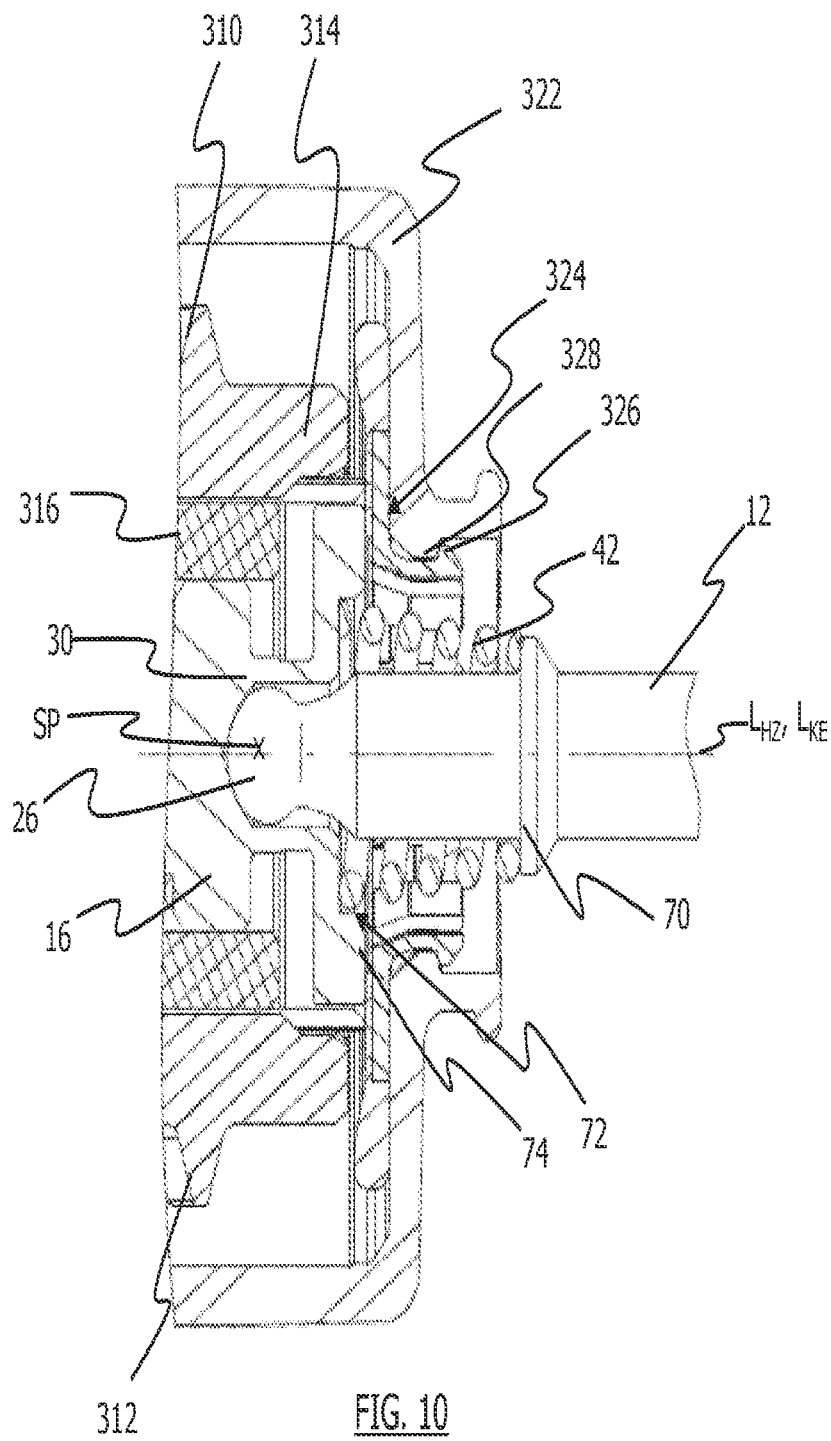
FIG. 10 shows an enlarged detail of the view according to FIG. 9.

FIG. 9 shows a system 1000 composed of an electromechanical brake booster 300 and the actuating device 210 according to a third exemplary embodiment. FIG. 10 shows an enlarged detail of the view according to FIG. 9. The brake booster 300 comprises an electric motor, not shown, a transmission 302, and an actuating unit 304. The transmission 302 comprises spur gears 306 and 308 and other transmission components that are not shown. The spur gears 306 and 308 are coupled to the actuating unit 304 of the brake booster 300. The spur gears 306 and 308 engage with toothed rack sections 310 and 312 of an actuating element 314 of the actuating unit 304.

The actuating element 314 partially accommodates a force transmission element 316. In the force transmission element 316, the force transmission member 16 of the brake master cylinder 14 of the actuating device 210 is accommodated so that it is able to move in the direction of the longitudinal axis L. The force transmission member 16 is supported against the force transmission element 316 by means of a spring 70. The force transmission element 316 has a contacting projection 318. The actuating element 314 rests with its axial end section 320 against the contacting projection 318. The actuating element 314 can rest with its axial end section 320 against the contacting projection 318 of the force transmission element 316 in order, by means of this contact, to be able to transmit the boosting force, which has been produced by the electric motor and the transmission 302, to the force transmission element 316.

The force transmission member 16 is coupled to the force input member 12 in an articulating fashion by means of the articulation 32. When the brake booster 100 is installed in a vehicle (not shown), the force input member 12 can protrude into the passenger compartment.

The positioning element 42 of the actuating device 210 is embodied in the form of a spring, which partially encompasses the force input member 12. The force input member 12 has a projection 70 on which the spring 42 is axially supported with one of its ends, With its other end, the spring 42 is supported against a recess 72 of the force transmission member 16. The recess 72 is embodied on a surface 74 of the force transmission member 16 extending essentially perpendicular to the longitudinal axis $L_{HZ}$ of the brake master cylinder 14 (also see FIG. 10). The recess 72 extends around the receptacle 30 in the force transmission member 16. The receptacle 30 of the force transmission member 16 accommodates the spherical end section 26 of the force input member 12 in order to form the articulation 32. The spring 42 is conical in shape. The diameter of the spring 42 decreases starting from its section resting against the force transmission member 16 in the direction of the 70 on the force input member 12. The projection 70 encompasses the force input member 12. It is also conceivable, however, to provide several projections that are offset from one another against which the spring 42 can be supported.

FIGS. 9 and 10 show the installation position of the force input member 12. The spring 42 is embodied as elastically deformable and produces a holding force in the form of a spring force with which the force input member 12 is held in its installation position. When the holding force is exceeded, an elastic deformation of the spring 42 takes place in opposition to this spring force.

In the installation position of the force input member 12, the longitudinal axis $L_{KE}$ of the force input member 12 coincides with the longitudinal axis $L_{HZ}$ of the brake master cylinder 14, i.e. the longitudinal axes $L_{HZ}$, $L_{KE}$ of the force input member 12 and brake master cylinder 14 are superposed. The longitudinal axis $L_{HZ}$ of the brake master cylinder 14 defines the actuation direction in which the force input member 12, the force transmission member 16, the force transmission element 316, and the actuating element 314 of the brake booster 300 can move in order to actuate the brake master cylinder 14. After the holding force is exceeded, the force input member 12 can be pivoted around the pivot point SP that is defined by the articulation 32.

The brake booster 300 has a housing 322 in which at least the actuating unit 304 is accommodated. The housing 322 can be coupled to a housing (not shown) of the brake master cylinder 14. The actuating device 210 can be at least partially accommodated in the housing 322. Between the actuating element 314 and the housing 322, there is a damping element 324 (see FIG. 10). In a restoring movement of the actuating unit 304, the damping element 324 damps the impact of the actuating element 314 against the housing 322. The damping element 324 can be locked in detent fashion to the housing 322. The damping element 324 and the housing 322 can have corresponding detent formations for this purpose. A detent projection 326 protruding radially outward can be provided on the damping element 324. A projection 328 protruding radially inward can be embodied on the housing 322 and can lock in detent fashion with the detent projection 326. The damping action of the damping element 324 makes it possible to hinder unwanted vibrations and in particular, noise emissions (such as impact noises).

The brake master cylinder 14 also has a rubber-elastic reaction disc 76, which is connected to a force introduction element 78 (see FIG. 9). The reaction disc 76 is partially accommodated in the force transmission element 316. On the force transmission member 16, an end element 80 is provided, which is embodied to act on the reaction disc 76 when the actuating device 210 is actuated. The force introduction element 78 has a pin-shaped section 82. This pin-shaped section 82 is embodied to be partially accommodated by a piston, not shown, of the brake master cylinder 14. The brake master cylinder 14 can also have several pistons, which define hydraulic fluid-filled pressure chambers (not shown) in a housing, not shown, of the brake master cylinder 14. This housing, not shown, of the brake master cylinder 14 can be coupled to the housing 322 of the brake booster 300. In addition, a return spring 84 is provided, which prestresses the actuating device 210 into its starting position.

The positioning element 42 holds the force input member 12 in the installation position. As a result, it is possible to simplify the installation of the actuating device 10, 110, 210. The actuating device 10, 110, 210 with the force input member 12 can be mounted on the firewall of the vehicle in the installation position. In the installation position, the force input member 12 can be quickly and simply inserted into the vehicle interior through an opening in the firewall. Because of the installation position, in the vehicle interior, the force input member 12 can be quickly and simply coupled to the brake pedal without the force input member 12 having to be laboriously aligned manually by the installer. After the predetermined holding force is exceeded, the positioning element 42 permits a deflection of the force transmission member 12 so that in the installed state, the force transmission member 12 can, for example, follow the pivoting movement of the brake pedal during service braking.

The invention claimed is:

1. An actuating device for a vehicle brake system, having:
    a force input member disposed between a brake pedal and a spherical end section, the force input member extending along a longitudinal axis and being integral to the spherical end section;
    a brake master cylinder, with the brake master cylinder having at least one force transmission member, which is coupled to the spherical end section of the force input member in an articulating fashion, and the force transmission member being positioned to transmit a force, which has been exerted onto the force input member and the spherical end section, to the brake master cylinder; and
    at least one elastically deformable positioning element being axially spaced apart from the spherical end section, wherein the at least one positioning element produces a holding force with which the at least one positioning element holds the at least one force input member in an installation position relative to the brake master cylinder;
    wherein the longitudinal axis of the force input member coincides with a longitudinal axis of the force transmission member when the force input member is in the installation position relative to the brake master cylinder, the force input member being pivotal relative to the force transmission member against the holding force produced by the positioning element.

2. The actuating device according to claim 1, wherein a longitudinal axis of the force input member essentially coincides with a longitudinal axis of the brake master cylinder in the installation position of the force input member.

3. The actuating device according to claim 1, wherein the at least one positioning element permits a deflection of the force input member after the holding force is exceeded.

4. The actuating device according to claim 1, wherein the at least one positioning element extends between the force input member and the force transmission member.

5. The actuating device according to claim 1, wherein the at least one positioning element is supported against the force input member and force transmission member in an axial direction and/or relative to a pivoting movement.

6. The actuating device according to claim 1, wherein the at least one positioning element can be moved together with the force input member and/or the force transmission member.

7. The actuating device according to claim 1, wherein the at least one positioning element is embodied in the form of a bushing.

8. The actuating device according to claim 1, wherein the at least one positioning element has at least one spring.

9. The actuating device according to claim 1, wherein the actuating device has an intermediate element, which is connected to the at least one force transmission member, and the at least one positioning element is supported against the intermediate element and the force input member.

10. The actuating device according to claim 1, wherein the at least one positioning element is at least partially accommodated in the intermediate element.

11. The actuating device according to claim 1, wherein the force transmission member and the force input member are coupled by means of an articulation that defines a pivot point around which the force input member can be pivoted.

12. The actuating device according to claim 1, wherein the force input member has a coupling device for coupling the force input member to the brake pedal and wherein the coupling device is provided at the end of the force input member opposite from the spherical end section.

13. The actuating device according to claim 12, wherein the at least one positioning element is positioned closer to the spherical end section than to the coupling device in the direction of the longitudinal axis of the force input member.

14. The actuating device according to claim 1, wherein the force transmission member has a recess in which the spherical end section of the force input member is accommodated, and wherein the recess of the force transmission member and the spherical end section of the force input member form an articulation that defines a pivot point.

15. The actuating device according to claim 1, wherein the actuating device has at least one housing in which the force transmission member is movably guided along the longitudinal axis or along the longitudinal axis of the brake master cylinder.

16. The actuating device according to claim 1, wherein the actuating device has a cover element, which is connected to a housing and at least partially encompasses the force input member and force transmission member.

17. The actuating device according to claim 1, wherein the force transmission member is a piston of the brake master cylinder or an element that is rigidly connected to the piston.

* * * * *